United States Patent [19]
Andrews

[11] 3,893,789
[45] July 8, 1975

[54] PITCH CHANGE ACTUATOR FOR A VARIABLE PITCH FAN PROPULSOR

[75] Inventor: Merritt B. Andrews, Westfield, Mass.

[73] Assignee: United Aircraft Corporation, East Hartford, Conn.

[22] Filed: Feb. 21, 1973

[21] Appl. No.: 334,334

[52] U.S. Cl. .................. 416/160; 416/170
[51] Int. Cl. .................. B63h 3/02; B64c 11/32
[58] Field of Search ... 74/640; 416/160, 170, 157 A

[56] References Cited
UNITED STATES PATENTS

| | | | |
|---|---|---|---|
| 2,573,783 | 11/1951 | Anderson et al. | 416/157 A |
| 2,906,143 | 9/1959 | Musser | 74/640 |
| 3,492,887 | 2/1970 | Ellinger | 74/640 X |
| 3,601,499 | 8/1971 | Ellinger | 416/160 |
| 3,647,320 | 3/1972 | Chilman et al. | 416/160 X |
| 3,663,119 | 5/1972 | Brooking et al. | 416/160 X |
| 3,672,788 | 6/1972 | Ellinger | 416/160 X |
| 3,729,276 | 4/1973 | Bogadjieff | 416/157 A UX |

*Primary Examiner*—Everette A. Powell, Jr.
*Attorney, Agent, or Firm*—Norman Friedland

[57] ABSTRACT

Blade angle of a variable pitch ducted fan is varied by transmitting a rotary pitch change mechanical signal across a rotating boundary by a differential gear train for driving a harmonic torque amplifier operatively connected to the root of the fan blades. A one-way rotary device cooperating with the input signal serves to obtain pitch lock.

5 Claims, 9 Drawing Figures

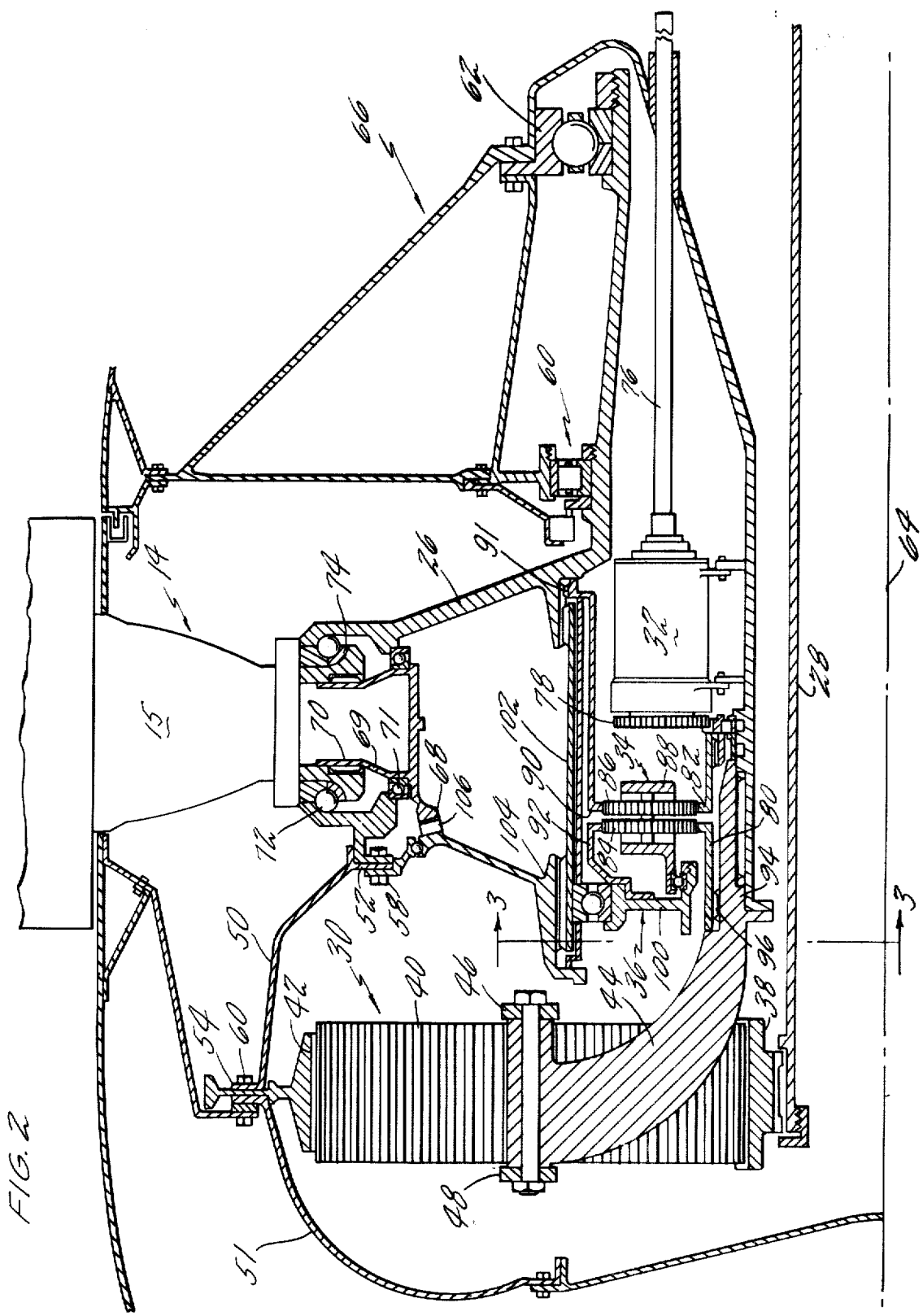

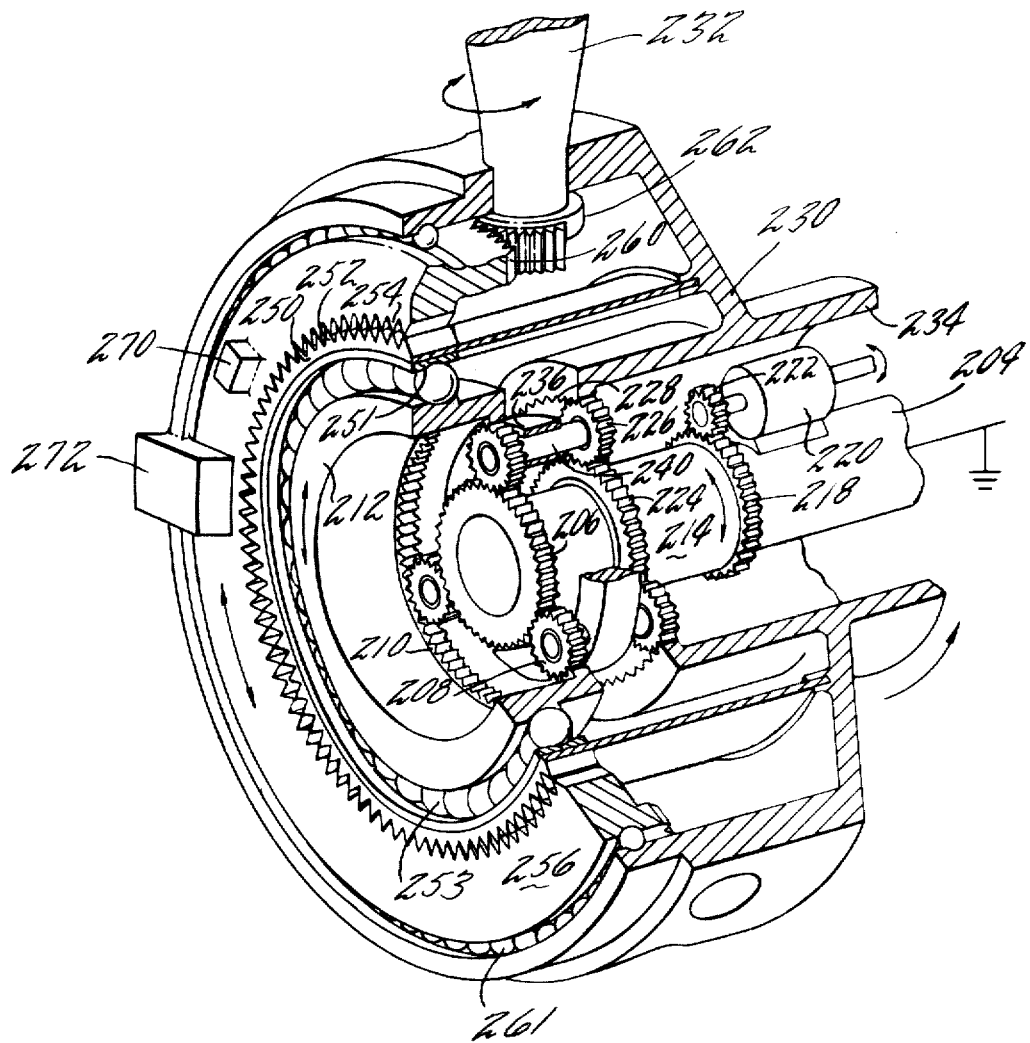

INCREASE BLADE ANGLE

DECREASE BLADE ANGLE

PITCH CHANGE ACTUATOR FOR A VARIABLE PITCH FAN PROPULSOR

BACKGROUND OF THE INVENTION

This invention relates to variable pitch ducted fan propulsors and particularly to the pitch change mechanism.

The problem solved by this invention is obtaining pitch change actuation for a ducted fan propulsor by varying blade angle at the rate of approximately 100° per second, which is three times faster than conventional propeller pitch change capabilities. This is accomplished without introducing high pressure and flow rates into the rotating rotor assembly.

This invention contemplates the use of a rotary member coupled to the root of the blade either by gears or trunnions that is disposed relative to the load transmission such that the load path results in shear stressing rather than bending that is generally associated with axial types of actuators.

A harmonic drive transmitting rotary motion from the pitch change input signal which is a rotary mechanical signal serves to amplify the torque at approximately 250/1 ratio.

A differential gear train is utilized in a novel manner to transmit the rotary input pitch change signal across a rotating boundary for driving the harmonic amplifier.

By utilizing a rotary one way drive, pitch lock can be achieved in a simple, and efficient manner.

By virtue of this arrangement, the control and power supply can be located separately from the actuator so as to afford a quick attach, detach mounting point located with other accessories.

SUMMARY OF THE INVENTION

It is an object of this invention to provide for a variable pitch ducted fan type of propulsor an improved pitch change actuation system.

A still further object of this invention is to provide for a variable pitch ducted fan a pitch change actuation system that includes a harmonic drive for amplifying a rotary input signal to a sufficient value to vary the blade angle of the fan blades at a relatively fast rate.

A still further object of this invention is to utilize in a ducted fan propulsor a differential gear train to transmit a rotary input pitch change signal across a rotating boundary.

A still further object of this invention is to provide for a ducted fan propulsor a one-way drive for obtaining pitch lock.

Other features and advantages will be apparent from the specification and claims and from the accompanying drawings which illustrate an embodiment of this invention.

BRIEF DESCRIPTION OF THE DRAWINGS

FIG. 2 is a partial view partly in section and partly in side elevation showing the details of this invention.

FIG. 4 is a perspective cut-away view partly in section illustrating a pitch change system.

DESCRIPTION OF THE PREFERRED EMBODIMENT

Figure 1:
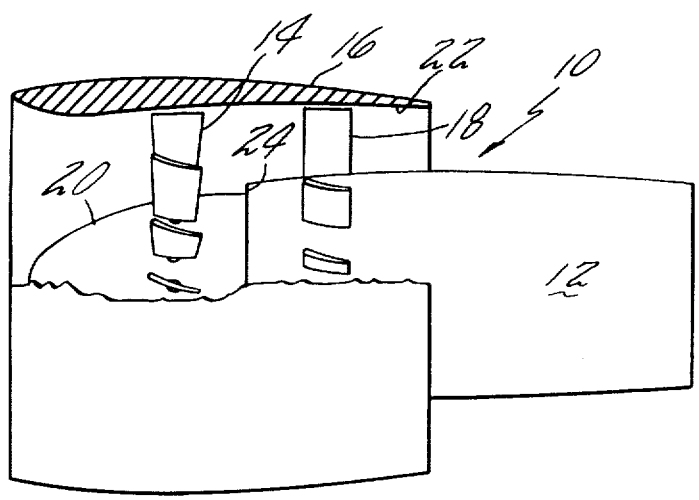
FIG. 1 is a schematic view partly in elevation, partly in section illustrating a variable pitch ducted fan propulsor.

Referring to FIG. 1 the variable pitch ducted fan propulsor is generally illustrated by numeral 10 comprising a turbine type of power plant illustrated by numeral 12 shown in blank driving the fan 14 housed within the duct 16 supported thereto by a plurality of stator vanes 18. The fan may include spinner 20 which serves to provide a smooth aerodynamic surface for directing the airflow through the fan, where a portion is discharged through the outlet of duct 16 via the stator vanes and a portion is directed into the inlet of the engine 24. Such variable pitch ducted fan propulsors are currently being developed by the Hamilton Standard Division of United Aircraft Corporation and while this invention is described in its preferred embodiment as being directed for aircraft propulsors it is to be understood as will be obvious to one skilled in the art that this invention may have applications for other embodiments.

The details of this invention may best be seen by referring to FIG. 2 which shows a hub 26 supporting the blades 15 (one being shown) circumferentially spaced about axis 64 driven by the power shaft 28 through the planetary gearing system illustrated by numeral 30. The pitch change actuating system comprises the input actuator 32, the differential 34 and the harmonic drive 36 all of which will be described hereinbelow.

The power shaft 28 driven by the engine 12 is splined to the sun gear 38 driving a plurality of planetary gears 40 which in turn are in mesh with the ring gear 42. Each of the plurality of planet gears rotatably supported to the spoke 44 are interconnected by a pair of straps 46 and 48 attached on either end. The operation and details of a suitable planetary gearing system is described and claimed in U.S. Pat. No. 3,314,310 granted to Raymond N. Quenneville on Apr. 18, 1967 and assigned to the same assignee and is incorporated herein by reference.

As is apparent from the foregoing, the power taken off of the power shaft 28 is transmitted to the ring gear 42 at a reduced speed and transmitted to the hub via connection 50 which carries a pair of flanges 52 and 54 attached to the hub 26 by a plurality of nut and bolt assemblies generally illustrated by 58 and ring gear 42 by a plurality of nut and bolt assemblies 60. Connection 50 is annular shaped and made from suitable material such that it is capable of being locally deflected radially, while being stiff in the torsional transverse shear directions. This construction serves to isolate the deflections of the fan from the ring gear 42. Member 51, also annularly shaped, is likewise bolted to the flange 54, and its stiffness characteristics are matched to the stiffness characteristics of connection 50 which prevents any out of plane distortion on ring gear 42. The hub 26 is suitably supported for rotary movement by bearings 60 and 62 so as to be rotatable about axis 64. The support housing 66 supporting bearings 60 and 62 extends inwardly and also supports the spokes 44 (only one of which is shown) of the planetary gears.

As will be fully described hereinbelow the blades 15 of the fan are rotatably supported to the rotor hub 26 for pitch change movement. Each blade carries a segment gear 68 formed on stub shaft 69 suitably connected to the root of the blades, as in this instance by a spline 70 and is rotatably supported therein by bearing 71. It being understood that the segment gear can be made integral with the blade root. Each blade is rotatably supported within the hub 26 by its own bearing 72 and supported by the retention mechanism 74. The shielded bearing 71 permits removal of individual blades without exposing the rotor and gearbox cavity.

Pitch change actuation is accomplished through the harmonic drive 36 which is interconnected to segment gear 68 and differential gear train 34. To effectuate pitch change movement the input rotary shaft 76 which in turn is controlled by a suitable control transmits the pitch change input signal to differential gear train 34 via the oneway drive 32. It should be understood that the one-way drive can be located on either side of the differential.

Consider for the moment that the control calls for a change in pitch of the fan blades, the control (not shown) serves to drive the input shaft 76 by rotating it clockwise or counterclockwise to rotate gear 78 through the one-way drive 32. This will impose a rotary signal to the differential. The differential is composed of a grounded sun gear 80, input sun gear 82, two groups of three planet gears 84 and 86 (only one of each group being shown) supported to a common carrier 88, a reference speed ring gear 90 and a second output ring gear 92 connected to the harmonic drive 36. As can be seen from FIG. 2 the reference speed ring gear 90 is suitably splined by spline 91 to the hub 26 so that it rotates therewith. A grounded sun gear 80 is likewise splined to the annular portion 94 of the spoke element 44 by spline 96. Annular portion 94 is splined to the fixed housing 66 so that sun gear 80 can be considered as a grounded or fixed member. With no pitch change input signal the speed of the carrier 88 is established by the reference speed ring gear 90 and the grounded sun gear 80. The application of a pitch change signal by virtue of rotation of gear 78 will cause sun gear 82 to rotate causing the planet carrier 88 to rotate to advance or retard of the established speed set up when there was no pitch change input signal condition. This retardation or advancement of the carrier produces a relative rotation between the reference and output ring gears. This rotation differential is the input to the harmonic drive 36.

The harmonic drive which is a high-ratio, speed reduction device is comprised of three basic components: lobed wave generator 100, flexing member or flex spline 102 and rigid circular ring or rigid spline 104. The wave generator is composed of a thin race ball bearing deflected in an ellipsoidal shape by the similar shaped rotating rigid disc within it. Flexspline 102 which is a thin wall cylinder and deflected into ellipsoidal crosssection by the wave generator imparts rotary motion to the circular spline 104 which carries mating teeth 106 engaging teeth 68 of the segment gear for rotating the blade 15 about its longitudinal axis for changing its pitch. The pitch in this instance may include, positive, negative, reverse and feather, and the movement may include going from positive through reverse to feather or from positive to feather and to reverse, or any combination thereof. A suitable harmonic drive is disclosed in U.S. Pat. No. 2,906,143 to C. S. Musser dated Sept. 29, 1969 and said patent is incorporated herein by reference.

Figure 3:
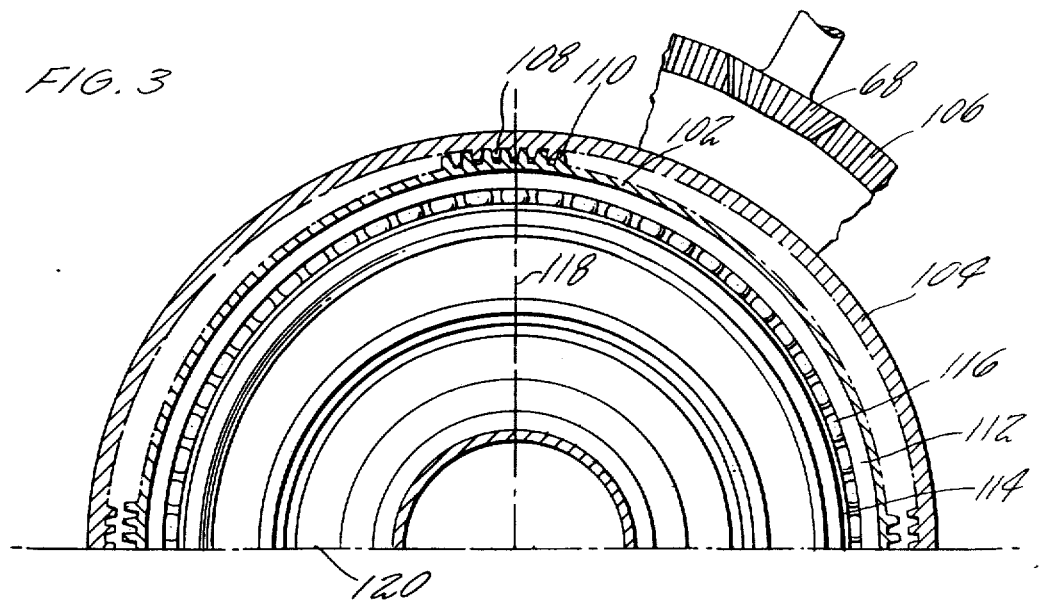
FIG. 3 is a sectional view taken along line 3—3 of FIG. 2.
Figure 5:
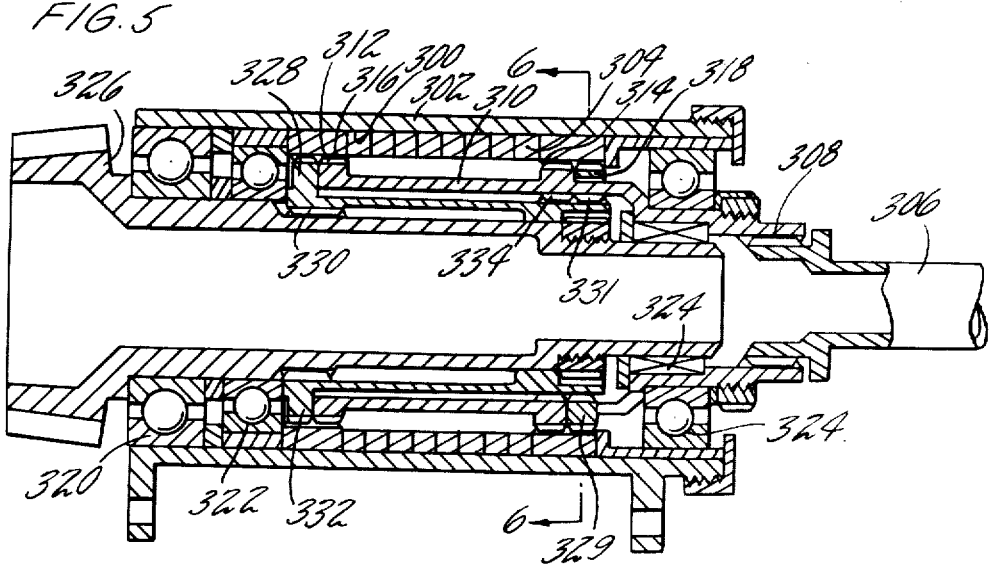
FIG. 5 is a sectional view illustrating a no-back actuator.
Figure 6:
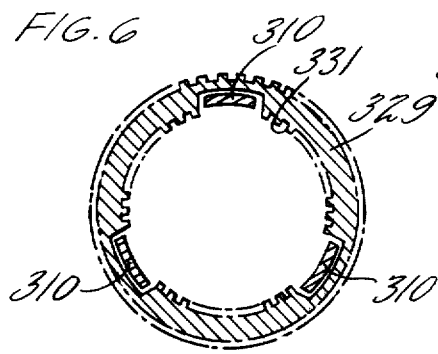
FIG. 6 is a sectional view taken along the lines 6—6 of FIG. 5.

The operation of a harmonic drive can probably best be understood by referring to FIG. 3 which shows a rigid circular ring 104 having internal teeth 108 engaging with the external teeth 110 of the flexspline 102. The thin race 112 of the wave generator when rotated deflects into an ellipsoidal shape by virtue of the rotating rigid disc 114 disposed adjacent to balls 116 of the ball bearing. The teeth at the major axes (dash line 118) are always in mesh and the teeth at the minor axes (dash line 120) are out of mesh. Since there are fewer teeth on the flexspline than on the circular rigid ring, each rotation of the wave generator moves the flexspline to a distance equal to the tooth differential between the splines.

As the wave generator is rotated it causes progressive tooth engagement. This causes rotation of the circular spline which carries teeth 106 which engages the segment gear 68 for imparting rotational movement (pitch change) to each individual blade. It is to be understood that each blade carries a similar segment gear which also is in contact with teeth 106 of the rigid circular ring.

The operation of the harmonic drive and the differential gear train can probably best be appreciated by referring to FIG. 4 that shows the details in schematic and in perspective. It will be appreciated that the differential gear train is used as the interface between the rotating and stationary components of the fan so that the pitch or blade angle positions are capable of being transmitted across a rotating boundary. Looking at the differential gear train it will be appreciated that in this embodiment the sun gear 206 is affixed or made integral with fixed shaft 204 of the differential and engages a plurality of (three) planetary gears 208. These planetary gears, in turn, engage ring gear 210 which is carried by or affixed to rigid disc 212 of the harmonic drive. Shaft 214 concentric to shaft 204 but rotatably disposed relative thereto carries spur gear 218 which is in mesh with the pitch changing input mechanism 220 and pinion gear 222. Mechanism 220 is a one way clutch that responds to the pitch control signal and will be described in more detail herein below. Sun gear 224 affixed to or made integral with shaft 214 engages a plurality (three) of planetary gears 226 and each planetary gear 226 in turn engages the internal gear or ring gear 228 formed on the rotor 230 which supports blades 232. The rotor, it being noted, is driven by shaft 234 which in turn is driven by the engine (not shown). Planetary gears 208 and 226 are carried by the carrier 236 supporting stub shafts 240.

It is apparent from the foregoing that sun gear 206 is held fixed since it is grounded to shaft 204 and that the planetary gears 226 driven by the reference speed ring gear 228 establishes the speed of carrier 236. The addition of a signal for either an increase or decrease pitch change movement will cause pinion gear 222 to rotate sun gear 224 via gear 218 and shaft 214 causing carrier 236 to either advance or retard from its established speed. This advancement or retardation, in turn, changes the speed of ring gear 210 relative to the rotor hub 230 and hence serves as the input to the harmonic drive. That is to say, it causes the wave generator disc 212 to either rotate clockwise or counterclockwise depending upon whether it was an advancement or retardation caused by the pitch change input signal.

As was described above the differential gear train transmits a pitch change signal across a rotating boundary and becomes the input to the harmonic drive. The next portion of the description will deal with the harmonic drive.

As mentioned earlier the harmonic drive consists of the wave generator, flex spline and a rigid circular ring or circular spline.

The wave generator consists of rigid disc 212 forming one race of the ball bearing and caused to rotate by ring gear 210. The other race 251 which is a thin flexible circular wall, deflects into an ellipsoidal shape by virtue of the similarly shaped rotating rigid disc within it.

Flexing element or flexspline 250 is in the form of a thin walled flexible cylinder, is deflected on one end adjacent the balls 253 of the ball bearing into the ellipsoidal cross sectional shape. The other end of the cylinder is supported by or secured to the rotor and is held in circular cross section. By virtue of the ellipsoidal shape of the rigid disc 212 which is transmitted to the flexspline and the differential in the member of teeth 252 formed integral with or affixed to the circular spline, the circular spline will move at a reduced speed from that of the input. Extremely high ratio of speed reduction are manifested by this mechanism with a consequential transmission of large torque.

Since the teeth of gear 260 affixed to the circular spline, rotatably supported by balls 261 to the rotor 230 for relative movement therebetween, meshes with segment gear 262 formed on the root of blade 232 it is apparent that the blade will rotate about its longitudinal axis and hence change blade angle (pitch).

If it is desirable to prevent the pitch of the blades to advance beyond a preascertained blade angle suitable stops may be employed. In this instance lug 270 affixed to and extending from the face of circular spline is made to abut against lug 272 extending downwardly from rotor hub 230. Obviously, since lug 272 is fixed and lug 270 rotates and since circular spline varies blade angle, by indexing the blade angle to the relative position of the lugs, the contact point will determine the barrier between the point where blade angle is and is not adjustable. This barrier lug can be used to limit low and high pitch extremes. In like manner intermediate removable stops can be executed.

As was mentioned above the one way clutch 32 of FIG. 2 and the one way clutch 220 of FIG. 4 serve to transmit the control signal from the pitch change control (not shown) to the differential. This effectively rotates gear 78 of FIG. 2 and gear 222 of FIG. 4 clockwise or counterclockwise in response to the polarity and magnitude of the input thereto. The circular spline in both schemes are correspondingly rotated in a clockwise or counterclockwise direction for effectuating pitch changing movement and this movement is generally referred to as raising or lowering the load. The purpose of the one way drive is to preclude unscheduled blade excursions to either increase or decrease pitch in the event of the loss of the command signal (rotation of input shaft 76 by the control system now shown). This unit operates on the principle of a self-energizing brake. Blade twisting torques when not supported by the input shaft 76 are grounded to the one way drive case, locking the blades in the last set position. This effectively achieves pitch locking without the attendant complicated pitch locking mechanism or the conventional heretofore known design.

A suitable one way drive, such as the one capable of use in the FIG. 2 and FIG. 4 embodiments is illustrated in FIGS. 5–9. The inner wall of bore 300 of casing 302 serves as a grounded braking hub by the action and reaction of the coil spring 304. The spring is interference fitted into the bore and normally engages wall of bore 300. The input shaft 306 which may be splined to the spring actuator connector 310 via spline 308, splines 312, 314 and 334 by extending through output spline segment 329.

Splines 312 and 314 are adapted to engage tangs 316 and 318 on opposite ends of coil spring 304. This serves to drive the spring ends in a predetermined phase with the input. Output shaft 326 supported in casing 302 by suitable bearings 320, 322 and 324 is rotated clockwise or counterclockwise depending on whether the input signal calls for increase or decrease pitch through an interrupted spline 334 and spline 330. The spline connection 328 and 329 interconnects the output shaft 326 via splines 330, 328, 331 and 318 to the coil spring 304. Through proper phasing of the aforementioned splinning a command input signal can release the spring from the case ground and continue to drive through the device to rotate the output. However, the output shaft is incapable of completing spring release, but further expands the spring into the case causing the self energizing brake effect.

Figure 7:
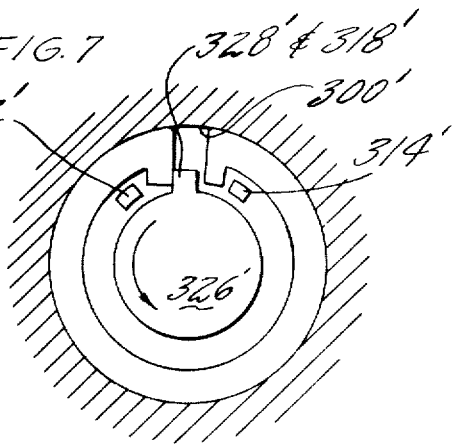
FIG. 7 is a diagrammatic view illustrating the operation of the no-back shown in FIG. 5.
Figure 8:
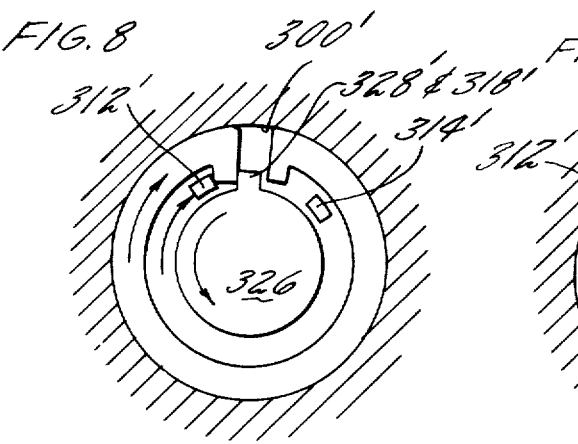
FIG. 8 is a showing of FIG. 7 in increase pitch condition.
Figure 9:
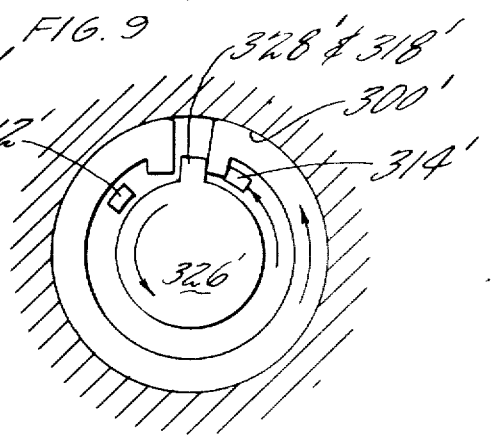
FIG. 9 is a showing of FIG. 7 in a decrease pitch.

The operation phasing of the one-way drive can probably best be understood by referring to the operational diagrams shown in FIGS. 7, 8 and 9. Additional description of the one-way drive may be had by referring to U.S. Pat. No. 3,631,951 granted to R. N. Quenneville on Jan. 4, 1972 and assigned to the same assignee. Here tangs have been used to diagrammatically illustrate the splines and the spring has been illustrated as having only one coil (the prime reference numerals as used herein are diagrammatic showings of the elements referenced by its like unprimed numerals). Rotation of the load shaft 326' in either direction drive the spring into an increasing force fit with the grounded housing 300' and friction locks these members hence achieve pitch lock (at this time the input drive 314', 312' does not engage the spring).

Decreasing pitch diagrammatically illustrated in FIG. 9 shows the input engaging the tang of the coil spring to unwind it from the hub and permitting the rotational movement.

Increase pitch shown in FIG. 8 shows the input engaging the tang of the coil. This drags the spring within the housing allowing rotation of the output shaft.

I claim:

1. For a ducted fan propulsor having a plurality of circumferentially spaced blades supported in a hub driven by a power plant, pitch change means for imparting rotary motion to said blades for varying the blade angle, said pitch change means including a harmonic drive means operatively connected to said blades, and means secured to a nonrotating element spaced from said hub for imparting a pitch change input signal to actuate said harmonic drive means to position said blades to various blade angles.

2. For a ducted fan propulsor as claimed in claim 1 wherein said harmonic drive includes a circular spline member, gear teeth formed in said circular spline member, segmented gear teeth formed on the root of said blades engaging said gear teeth on said circular spline member.

3. For a ducted fan as claimed in claim 1 including a one-way drive element disposed between said input signal imparting means and said harmonic drive to effectuate pitch lock.

4. For a ducted fan as claimed in claim 1 including a differential gear train operatively connected to said harmonic drive, said input signal imparting means connected to said differential gear train to actuate said harmonic drive.

5. For a ducted fan propulsor as claimed in claim 4 wherein said differential gear train includes a first sun gear mounted on a nonrotating member, a first ring gear affixed to said harmonic drive and a first set of planetary gears mating said first sun gear and said first ring gear, a second sun gear operatively connected to said input signal so as to be rotated thereby, a second ring gear affixed to said hub and being rotated therewith, a second set of planetary gears mating said second sun gear and said second ring gear, and a carrier interconnecting said first and said second planetary gears.

* * * * *